Sept. 2, 1969      E. G. LINDNER      3,464,138
DEVICE FOR RELEASING A SNAGGED FISHING LURE
Filed April 25, 1967
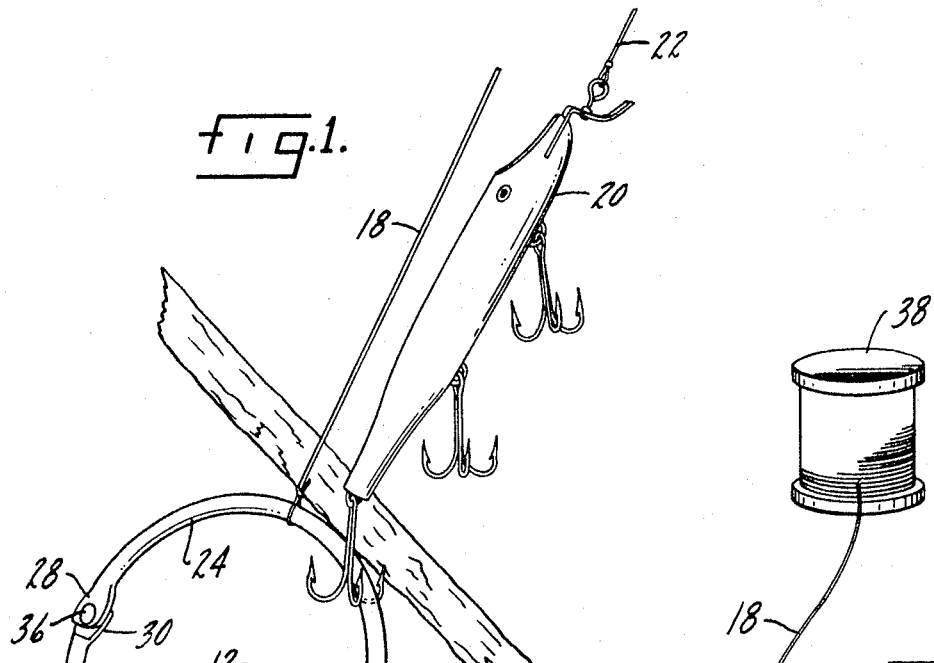
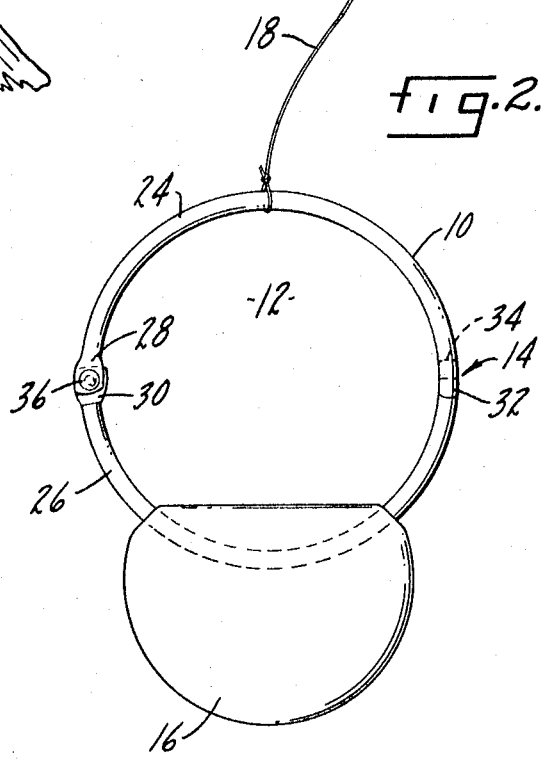
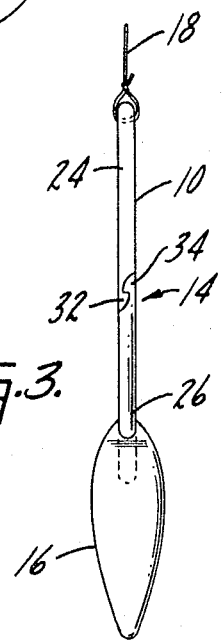
INVENTOR.
Edmund G. Lindner,
BY Parker & Carter
Attorneys.

United States Patent Office 3,464,138
Patented Sept. 2, 1969

3,464,138
DEVICE FOR RELEASING A SNAGGED FISHING LURE
Edmund G. Lindner, 2578 N. Booth St., Milwaukee, Wis. 53212
Filed Apr. 25, 1967, Ser. No. 633,578
Int. Cl. A01k 97/00
U.S. Cl. 43—17.2      3 Claims

ABSTRACT OF THE DISCLOSURE

A fishing lure releasing device has an openable and closable ring body. A weight attached to the body has a chordal portion within the ring and a tapered portion exteriorly thereof. A hauling line is attached to the body at one end and to a spool at its other end.

---

This invention relates to a device for releasing a snagged fishing lure and, more particularly, to a device for freeing a fishing lure, bait or plug when snagged on sticks, logs, weeds, rocks or similar obstructions.

Accordingly, a primary object of this invention is a weighted device for releasing a snagged fishing lure without bending or deforming the snagged hooks.

A further object is a device adapted to engage a snagged fishing lure and exert alternately upward and downward forces on the lure when jigged up and down by a hauling line.

Another object is an efficient device which is adapted to open and/or close by a simple closure means.

Another object is a reliable device which moves quickly and smootthly down a fishing line to the snagged lure.

Another object is an improved device constructed for ease in maneuvering through weeds or other obstructions so that the device does not snag itself.

Other objects will appear from time to time in the ensuing specification and drawings in which:

FIGURE 1 is a perspective view showing the device engaging a fishing lure;

FIGURE 2 is an enlarged front view of the device showing the hauling line and spool in perspective, and FIGURE 3 is a side view of the device.

The device for releasing a snagged fishing lure consists of a loop body 10 having an aperture 12 of sufficient size to loosely encircle the snagged lure 20. The loop body 10 is adapted to open and/or close, and may be opened to allow positioning of a fishing ine 22 within the aperture 12. The device may be attached to a hauling line 18, and is of sufficient weight to sink to a point where the lure is snagged. The device then engages the lure 20, and when jigged up and down by the hauling line 18, alternately exerts upward and downward forces on the lure, thereby releasing the snagged hooks. After the lure 20 is released, the device may be retrieved by the hauling line 18.

The loop body 10 may be any planar shape with an aperture or opening 12 therein, but is preferably annular as shown in the figures. The annular or ring shaped body 10 may have any cross-sectional shape, but is shown with a circular cross-section of small diameter. The circular cross-section is advantageous as it is smooth for ease in maneuvering through weeds or other obstructions. The size of the loop body 10 may vary, and will depend largely upon the size and shape of the lure or bait to be released. It is important that the aperture 12 of the loop body 10 to be large enough to loosely fit over the snagged lure 20 thereby permitting the device to easily slide over the lure or bait.

In its preferred form the loop body 10 consists of two semicircular bands 24 and 26 forming a substantially circular member or body. Each semicircular band 24 and 26 is hinged together at one set of ends 28 and 30 to form a substantially circular body 10, and is adapted to open by rotating about this hinged pivot point shown at 36.

A closure means 14 allows the ring-like body to remain closed when desired. In its preferred form the closure means 14 consists of a catch which meshes together when the loop body 10 is in a closed position. As shown in the figures, the other set of ends 32 and 34 of each band 24 and 26 mesh together to create a lock which keeps the ring-like body 10 closed during use.

A weight 16 may be an integral element of the loop body 10 or may be attached to the loop body. The weight 16 may be attached by any means such as melting lead around one portion of the loop body.

The weight allows the device to sink to a point where the lure 20 is snagged, and may disengage the snagged hooks by its initial downward force. However, in many situations it will be necessary to jig the device up and down with the weight causing a downward force by sinking when the hauling line 18 is slackened. This jigging action will cause the hooks to break loose or back out of the obstruction thereby releasing the lure 20 without bending or deforming the snagged hooks. The weight 16 may vary in size, but it has been found that a six ounce weight works well in use.

A hauling line 18 is adapted to be attached to the device, and is of sufficient strength to withstand tthe pulling forces it is subjected to without breaking. The length of the hauling line 18 may vary, and will depend upon how much line is used while fishing and the depth of the water being fished. The hauling line may be any string or cable-like member, but is preferably a nylon cord. In addition, the hauling line 18 is preferably attached to a spool 38, or similar object about which it may be wound or unwound as desired.

The weight 16 is elongated and is positioned generally in the plane of the body 10 on the semicircular band 26. An upper portion of the weight is positioned within the arc of body 10 and forms a chordal portion which is substantially parallel to a diameter of the body extending through the pivot point and lock. A substantial majority of the mass of the weight extends exteriorly of the body and has a tapered bottom portion to minimize resistance to motion through water.

The use, operation and function of this invention are as follows:

This invention may be used with any type of fishing lure, bait or plug, and as mentioned, is used to free a snagged lure without bending or deforming the snagged hooks.

The use of this device is very simple. When a fisherman's lure or bait gets caught on an obstruction below the surface, the fisherman first moves his boat to a position approximately over the snagged lure or bait 20. The loop body 10 is then opened, placed around the snagged fishing line 22 and then closed. Next, the fishing line 22 is held taut and the device released and allowed to slide down the taut fishing line to the snagged lure 20. The sliding of the weighted device down the taut fishing line 22 will cause an initial downward force on the snagged lure 20 and may knock the snagged hooks out of the obstruction. However, if the initial downward force of the weighted device does not free the snagged hooks, then the fishing line 22 is slakened and the device jigged up and down by the hauling line 18 causing an alternately upward and downward force on the lure 20.

The downward force on the lure 20 is caused by sinking of the weighted device when the hauling line 18 is slackened and will back the snagged hooks out of the obstruction without bending or deforming the hooks. It is also important to note that these above described steps have the effect of preventing the barbs on the snagged hooks from further penetrating the obstruction making it much simpler to remove the snagged hooks.

I claim:

1. A device for releasing a snagged fishing lure including:

an annular ring formed from an upper and a lower generally semicircular band, each semicircular band being hingedly connected together at one set of ends to form a pivot point and having overlapping free ends adapted to mesh together to form a lock means at the other set of ends;

an elongated weight lying in a common plane with the annular ring rigidly attached to the lower generally semicircular band between the pivot point and the lock means and extending downward a substantial distance below the lower generally semicircular band, said weight having a tapered bottom portion to minimize resistance to motion through water and having an upper chordal portion within the arc of the annular ring substantially parallel to a diameter of the annular ring extending through the pivot point and the lock means, said chordal portion having a blunt surface to assist in jarring the snagged lure free from an obstruction; and a hauling line of sufficient length to allow the device to sink to a point where the lure is snagged and exert alternately upward and downward forces on the lure, said hauling line being attached at its lower end to the uppermost portion of the upper generally semicircular band for retrieving the device after the lure is released from the obstruction.

2. The structure of claim 1 further characterized in that the weight is positioned on the annular ring so that a substantial majority of its mass is exterior of the annular ring.

3. The structure of claim 1 further characterized in that the hauling line operates in a plane substantially perpendicular to the chordal portion of the weight and is attached at its upper end to a spool means about which the hauling line may be wound or unwound as desired.

References Cited

UNITED STATES PATENTS

| | | | |
|---|---|---|---|
| 2,507,495 | 5/1950 | Barthel | 43—17.2 |
| 3,010,240 | 11/1961 | Surcouf | 43—17.2 |
| 3,172,225 | 3/1965 | Zoss | 43—17.2 |
| 3,296,730 | 1/1967 | Leverdingen | 43—17.2 |
| 3,336,067 | 8/1967 | Cloyd | 43—17.2 X |
| 3,375,601 | 4/1968 | Matthews | 43—5 |

WARNER H. CAMP, Primary Examiner